United States Patent
Kerr et al.

(10) Patent No.: US 8,356,807 B2
(45) Date of Patent: Jan. 22, 2013

(54) DUAL RATE SHOCK ABSORBING APPARATUS FOR A SUSPENSION SYSTEM OF A HEAVY OFF-ROAD VEHICLE

(75) Inventors: Ronald W. Kerr, Geneva, IL (US); Richard J. Beranek, Maple Park, IL (US)

(73) Assignee: Miner Elastomer Products Corporation, Geneva, IL (US)

( * ) Notice: Subject to any disclaimer, the term of this patent is extended or adjusted under 35 U.S.C. 154(b) by 272 days.

(21) Appl. No.: 12/803,323

(22) Filed: Jun. 24, 2010

(65) Prior Publication Data

US 2011/0316209 A1 Dec. 29, 2011

(51) Int. Cl.
*B60G 11/22* (2006.01)

(52) U.S. Cl. ..... 267/293; 267/292; 267/294; 267/64.26; 213/40 R; 213/45

(58) Field of Classification Search ................ 267/293, 267/294, 153, 141.1, 64.26, 292, 201; 213/40 R, 213/44, 45; 73/117.03; 244/104 R
See application file for complete search history.

(56) References Cited

U.S. PATENT DOCUMENTS

| | | | | |
|---|---|---|---|---|
| 1,544,032 | A | * | 6/1925 | Potez .......................... 267/293 |
| 2,469,126 | A | * | 5/1949 | Munro et al. ................ 213/46 A |
| 2,486,741 | A | * | 11/1949 | Gabriel ........................ 267/293 |
| 3,084,809 | A | * | 4/1963 | Lucchese ..................... 213/220 |
| 3,259,397 | A | * | 7/1966 | Doennecke ............ 280/124.127 |
| 3,434,708 | A | | 3/1969 | Hawk, Jr. |
| 3,537,696 | A | | 11/1970 | Webster, Jr. |
| 4,148,469 | A | | 4/1979 | Geyer |
| 4,623,162 | A | | 11/1986 | Weitzenhof et al. |
| 4,756,512 | A | | 7/1988 | Toms, Jr. |
| 4,798,398 | A | | 1/1989 | Cummins |
| 4,997,171 | A | | 3/1991 | Toms, Jr. |
| 5,183,137 | A | | 2/1993 | Siwek et al. |

(Continued)

FOREIGN PATENT DOCUMENTS

EP 0 277 788 A2 2/1988

OTHER PUBLICATIONS

International Searching Authority/US; International Search Report regarding PCT/US2011/000978; Oct. 5, 2011; 3 pages.

(Continued)

*Primary Examiner* — Robert A Siconolfi
*Assistant Examiner* — Mariano Sy
(74) *Attorney, Agent, or Firm* — Law Office of John W. Harbst

(57) ABSTRACT

A dual rate shock absorbing apparatus for a suspension system of a heavy off-road vehicle including a housing having two axially elongated members. A dual rate spring package is disposed in the housing. Such spring package includes a first spring assembly for absorbing, dissipating and returning a first predetermined level of energy imparted to the shock absorbing apparatus. One end of the first spring assembly acts against a closed end of the housing and a second end acts against a spring seat. A second spring assembly absorbs, dissipates and returns a second predetermined level of energy. One end of the second spring assembly acts against an opposed closed end of the housing and a second end acts against the spring seat. An axially elongated guide assembly, extending substantially the cumulative length of the first and second spring assemblies, controls axial compression of the first and second spring assemblies. An operable length of the guide assembly is automatically adjustable to the length of the housing during operation of the shock absorbing apparatus. An apparatus for monitoring loads applied to the shock absorbing apparatus is also provided.

24 Claims, 9 Drawing Sheets

U.S. PATENT DOCUMENTS

| | | | |
|---|---|---|---|
| 5,351,844 A * | 10/1994 | Carlstedt | 213/44 |
| 5,482,261 A | 1/1996 | Ortega | |
| 5,845,796 A | 12/1998 | Miller | |
| 6,290,038 B1 | 9/2001 | Jensen et al. | |
| 6,443,437 B1 | 9/2002 | Beyene et al. | |
| 6,471,198 B2 * | 10/2002 | Herbst | 267/293 |
| 6,520,360 B1 * | 2/2003 | Withall et al. | 213/220 |
| 6,659,438 B2 | 12/2003 | Michael et al. | |
| 7,052,001 B2 | 5/2006 | Hilt et al. | |
| 7,184,866 B2 | 2/2007 | Squires et al. | |

OTHER PUBLICATIONS

International Searching Authority/US; Written Opinion of the International Searching Authority regarding PCT/US2011/000978; Oct. 5, 2011; 7 pages.

* cited by examiner

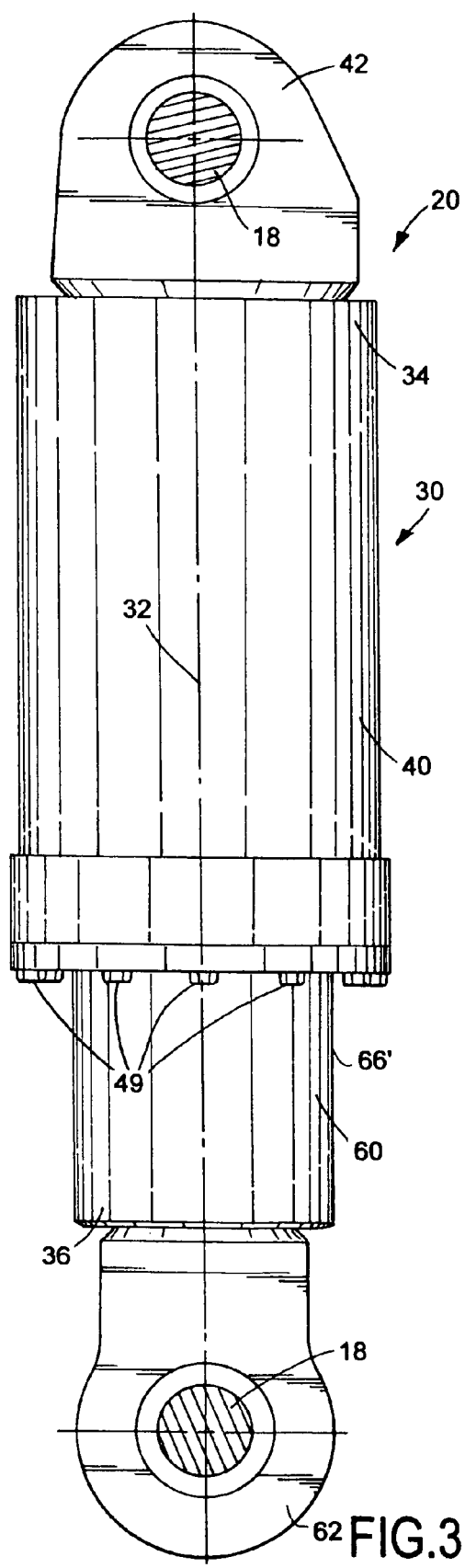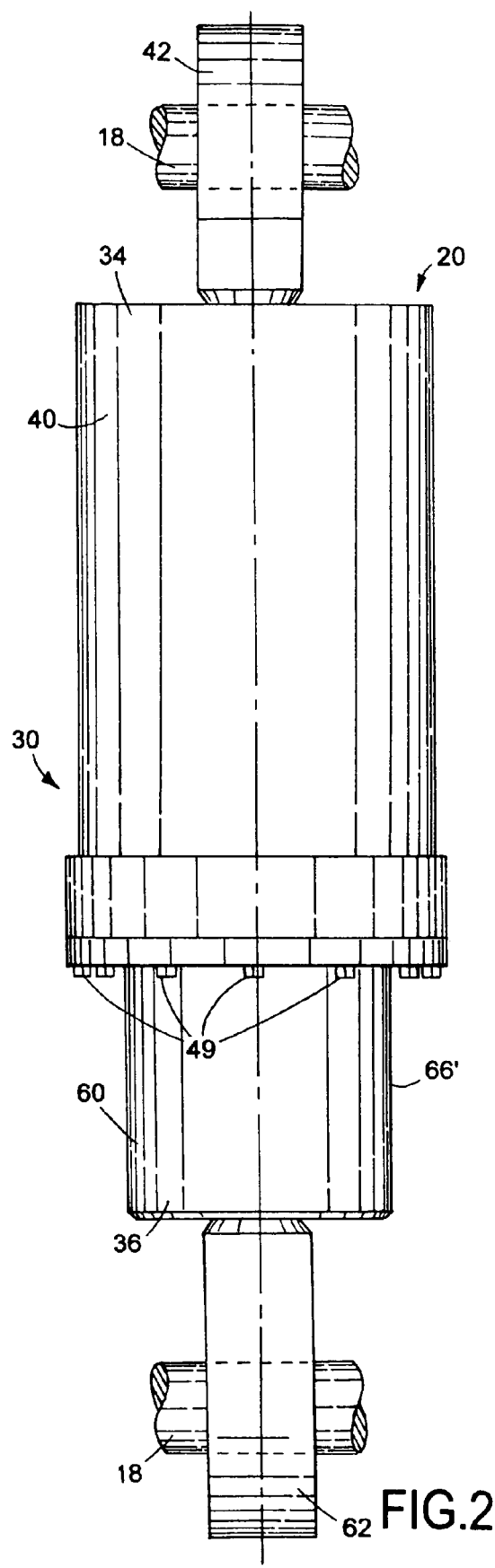

DUAL RATE SHOCK ABSORBING APPARATUS FOR A SUSPENSION SYSTEM OF A HEAVY OFF-ROAD VEHICLE

FIELD OF THE INVENTION DISCLOSURE

The present invention disclosure generally relates to heavy off-road vehicles and, more particularly, to a dual rate shock absorbing apparatus for a suspension system of a heavy off-road vehicle.

BACKGROUND OF THE INVENTION DISCLOSURE

Heavy off-road vehicles or trucks which are designed to carry heavy loads of cargo typically include a wheeled frame and a truck body portion supported by the frame. The truck body portion of such vehicles can carry loads in the range of 35 to 300 tons. Out of necessity, such vehicles employ some sort of shock absorbing device as part of the suspension system.

During operation, such vehicles operate in either of two conditions: empty or loaded. In these applications, the difference in weight or load acting on the vehicle suspension system can be quite substantial and a single element suspension system will perform poorly in one or the other condition. In the 1990's there was a change in the industry regarding suspension design. The OEM's all perceived a need and desire for better ride quality with an emphasis on when the vehicle was operating in an empty condition. It is most desirable to the vehicle driver to have a suspension system which offers a relatively soft ride when the load is at a minimum but yet is stiffer when the supported load is at a maximum whereby improving load stability.

Moreover, the OEM's of such vehicles desired the ability to monitor and record the actual loads being carried in the truck body portion of each vehicle. As such, it would be possible to optimize the amount of loading of the vehicle and thereby increase component life, maximize productivity and monitor vehicle activities, i.e., rough road conditions, and the like.

Thus, there is a continuing need and desire for a dual rate shock absorbing apparatus for a suspension system of a heavy off-road vehicle which works in a first or relatively soft condition when the supported load is at a minimum and a second relatively stiff condition when the supported load being carried by the vehicle is significantly greater. Moreover, there is a continuing need and desire for such a dual rate shock absorbing apparatus for a off-road heavy duty vehicle suspension system which has the ability to monitor and provide an indication of the loads acting on the suspension system.

SUMMARY OF THE INVENTION DISCLOSURE

In view of the above, and in accordance with one aspect, there is provided a dual rate shock absorbing apparatus for a suspension system of a heavy off-road vehicle. Such shock absorbing apparatus includes a housing having an axially elongated outer member and an axially elongated inner member. Each housing member has a closed end and an open end. Moreover, structure is provided toward the closed end of each housing member for facilitating connection of the shock absorbing apparatus between two parts on the vehicle. Lengthwise portions of the open ends of the inner and outer housing members are arranged in sliding relation relative to each other in response to loads being exerted on the absorbing apparatus.

A dual rate spring package is disposed in the housing to provide superior suspension performance when the vehicle is operated in either empty or loaded conditions. Such spring package includes a first or "soft" elastomeric spring assembly for absorbing, dissipating and returning a first predetermined level of energy imparted to the shock absorbing apparatus when the closed ends of the housing members are compressed toward each other within a predetermined range of axial movement. One end of the first spring assembly acts against a closed end of the inner housing and a second end acts against a spring seat. A second elastometic spring assembly is provided for absorbing, dissipating and returning a second predetermined level of energy, different from the first predetermined level of energy, imparted to the shock absorbing apparatus when the closed ends of the housing members are compressed toward each other. One end of the second spring assembly acts against a closed end of the outer housing and a second end acts against the spring seat disposed between opposed ends of the spring assemblies. An axially elongated guide assembly, extending substantially the cumulative length of the first and second spring assemblies, is provided for controlling compression of the spring assemblies. An operable length of the guide assembly is automatically adjustable to the length of the housing during operation of the shock absorbing apparatus.

Preferably, the elongated guide assembly of the shock absorbing apparatus axially extends generally centrally through the first and second spring assemblies and the spring seat. In one form, the elongated guide assembly of the shock absorbing apparatus includes two axially elongated guides arranged in at least partially telescoping relation relative to each other.

In one form, a follower is carried on and moves with the inner housing member. After the "soft" spring assembly has been compressed a predetermined amount, the follower on the inner member "bottoms out" and engages with the spring seat so as to allow the shock absorbing apparatus to transition operation between when the vehicle operates in an empty or unloaded condition and a loaded condition.

In one embodiment, the shock absorbing apparatus further includes a stop for inhibiting inadvertent axial separation of the housing members relative to each other. In a preferred form, the shock absorbing apparatus further includes structure for guiding and aligning the outer housing member and inner housing member relative to each other.

The shock absorbing apparatus is preferably designed to further include an apparatus for monitoring compressive loads applied to the shock absorbing apparatus during operation of the vehicle. In one form, the apparatus for monitoring compressive loads includes a load cell capable of monitoring and providing an electric signal indicative of the load applied to the shock absorbing apparatus. In another form, the apparatus for monitoring compressive loads includes a piston head slidably sealed to an inner periphery of at least one of the inner and outer members such that a pressurized fluid chamber is defined between the piston head and the closed end of the at least one of the inner and outer members. The piston head is operably coupled to and movable with the guide of the respective spring assembly. A device is provided for monitoring and producing an electric signal indicative of the level of pressure in the chamber. In one form, the device for monitoring the level of pressure in the chamber includes a pressure transducer.

According to another aspect, there is provided a dual rate shock absorbing apparatus for a suspension system of a heavy off-road vehicle including an axially elongated housing having first and second axially spaced ends. Each end of the housing has structure for facilitating connection of the shock absorbing apparatus operably between first and second body parts on the vehicle. The housing includes an axially elongated inner member having a closed end and an open end and an axially elongated outer member having a closed end and an open end. Lengthwise portions of the open ends of the inner and outer members are arranged in sliding relation relative to each other. An axially elongated elastomeric spring assembly is arranged within an interior chamber defined by the housing between the closed ends of the inner and outer housing members. The spring assembly includes a first elastomeric spring assembly for absorbing, dissipating and returning a first predetermined level of energy imparted to the shock absorbing apparatus when the housing members are axially compressed toward each other within a predetermined range of axial movement. A second elastomeric spring assembly is provided for absorbing, dissipating and returning a second predetermined level of energy after the first predetermined level of energy imparted to the shock absorbing apparatus is exceeded. A spring seat is disposed between the first and second elastomeric spring assemblies. An axially elongated guide assembly substantially extends a cumulative length of and generally centrally through the first and second spring assemblies for controlling axial compression of the first and second spring assemblies. An operable length of the guide assembly is automatically adjustable to the length of the housing during operation of the shock absorbing apparatus.

Preferably, the elongated guide assembly axially includes two axially elongated guides arranged in at least partially telescoping relation relative to each other. In a preferred form, the shock absorbing apparatus further includes a follower arranged between the spring seat and the closed end of the inner housing member for moving with the inner housing member in response to axial loads being exerted upon the shock absorbing apparatus. In one embodiment, the shock absorbing apparatus further includes a stop for inhibiting inadvertent axial separation of the housing members relative to each other. In another form, the shock absorbing apparatus further includes structure for guiding and aligning the housing members relative to each other and about a central axis of the shock absorbing apparatus. The structure for guiding and aligning the housing members preferably includes at least two axially spaced bushings.

In one embodiment, the shock absorbing apparatus further includes an apparatus for monitoring compressive loads applied to the shock absorbing apparatus during operation of the heavy off-road vehicle. In one form, the apparatus for monitoring compressive loads includes a load cell arranged toward the closed end of the outer housing member for monitoring and providing a signal indicative of the load applied to the shock absorbing apparatus. In another form, the apparatus for monitoring compressive loads includes a piston head slidably sealed to an inner periphery of the outer member such that a pressurized fluid chamber is defined between the piston head and the closed end of the outer member. The piston head is operably coupled to and movable with the guide of the first spring assembly. A device is provided for monitoring the level of pressure in the fluid chamber. Preferably, such device is further capable of generating a signal indicative of the level of pressure in the chamber. In one form, the device for monitoring the level of pressure in the chamber includes a pressure transducer.

According to another aspect, there is provided a dual rate shock absorbing apparatus for a suspension system of a heavy off-road vehicle and including a housing with an axially elongated outer generally cylindrical member having a closed end and an open end, and with the closed end of the outer member having structure for facilitating connection of the housing to a first body part on the vehicle. The housing further includes an axially elongated generally cylindrical inner member having a closed end and an open end, and with lengthwise portions of the open ends of the inner and outer generally cylindrical members being arranged in telescopic relation relative to each other. The closed end of the inner member has structure for facilitating connection of the housing to a second body part on the vehicle. Structure is disposed between the lengthwise portions of the inner and outer members for effecting guidance and alignment of the housing members relative to each other. Moreover, a spring seat is arranged in an interior chamber defined by the inner and outer members of the housing.

In this embodiment, a dual rate spring is arranged in the interior of the housing. The dual rate spring includes a first spring assembly for allowing the shock absorbing apparatus to yield a first spring rate when the housing members are compressed toward each other within a predetermined range of axial movement. One end of the first spring assembly acts against a closed end of the inner housing and a second end acts against the spring seat. The first spring assembly includes a series of stacked spring pads. Each pad has an elastomeric member with a torodial configuration sandwiched between two plates. The series of axially stacked spring pads of the first spring assembly are axially guided by an elongated guide.

The dual rate spring also includes a second spring assembly for allowing the shock absorbing apparatus to yield a second spring rate when the first spring rate of the first spring assembly is exceeded. One end of the second spring assembly acts against a closed end of the outer housing and an axially aligned second end acts against the spring seat. The second spring assembly includes a series of axially stacked spring pads. Each pad includes an elastomeric member having a torodial configuration sandwiched between two plates. The series of axially stacked spring pads are axially guided by an elongated member axially extending substantially the length of the second spring assembly. A free end of the guide of the first spring assembly is arranged in telescoping relation with the elongated member of the second spring assembly such that axial alignment is maintained between the spring assemblies during compression of the shock absorbing apparatus.

In one form, the shock absorbing apparatus further includes a follower carried by and movable with the inner housing member. The follower is arranged between the closed end of the outer housing member and the spring seat. Preferably, the shock absorbing apparatus further includes a stop for inhibiting inadvertent axial separation of the housing members.

Preferably, the shock absorbing apparatus further includes an apparatus for monitoring compressive loads applied to the shock absorbing apparatus during operation of the heavy off-road vehicle. In one form, the apparatus for monitoring compressive loads includes a load cell arranged toward the closed end of the outer housing member for monitoring and providing a signal indicative of the load applied to the shock absorbing apparatus. In another form, the apparatus for monitoring compressive loads includes a piston head slidably sealed to an inner periphery of the outer member such that a pressurized fluid chamber is defined between the piston head and the closed end of the outer member. The piston head is operably coupled to and movable with the guide of the second spring assembly. A device is provided for monitoring the level of pressure in the chamber. Such device is also capable of generating an electrical signal indicative of the level of pressure in the chamber. In one form, such device for monitoring the level of pressure in the chamber includes a pressure transducer.

BRIEF DESCRIPTION OF THE DRAWINGS

FIG. 2 is an enlarged elevation view of one form of a shock absorbing apparatus embodying principals and teachings of the present invention disclosure;

FIG. 3 is another enlarged elevation view of the shock absorbing apparatus illustrated in FIG. 2;

DETAILED DESCRIPTION OF THE INVENTION DISCLOSURE

Figure 1:
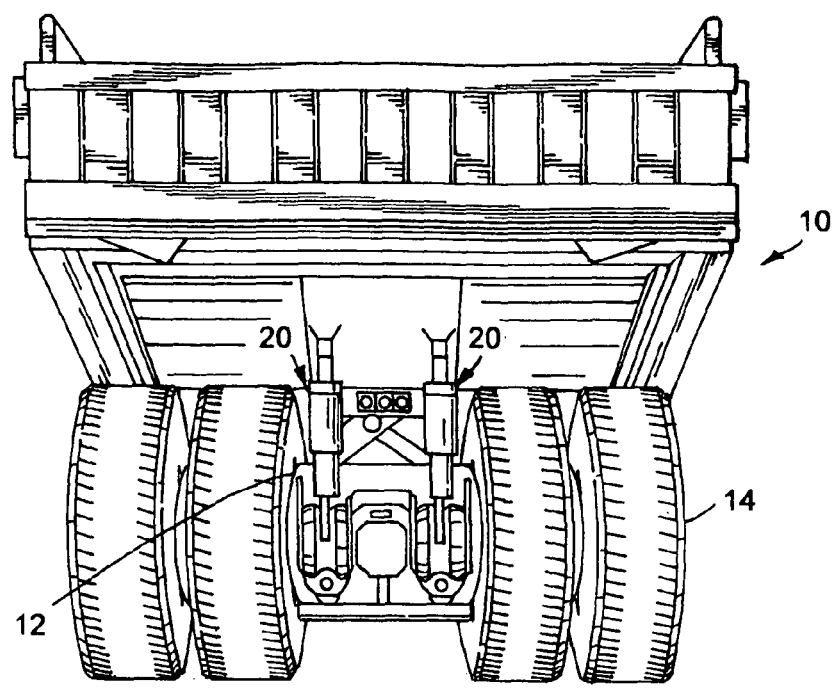
FIG. 1 is a rear view of a heavy off-road showing a suspension system including at least two shock absorbing mechanisms which are the subject of the present invention disclosure.

While this invention disclosure is susceptible of embodiment in multiple forms, there is shown in the drawings and will hereinafter be described preferred embodiments, with the understanding the present disclosure sets forth exemplifications of the disclosure which are not intended to limit the disclosure to the specific embodiments illustrated and described.

Referring now to the drawings, wherein like reference numerals indicate like parts throughout the several views, there is shown in FIG. 1 a heavy off-road self-propelled vehicle capable of carrying and transporting cargo in the range of 30 to 300 tons. Such vehicle is generally identified by reference numeral 10 and essentially includes two groups of components. The first is the main frame 12 which includes generally the frame, the cab, engine, and etc. The other main component 14 includes the axle system, tires, drive mechanism, and etc. Between these two main groups of components is a suspension system including, toward a rear of the vehicle, at least two shock absorbing mechanisms 20. For all practical purposes, the shock absorbing mechanisms 20 are essentially the same and, therefore, discussion will be limited to one shock absorbing apparatus or mechanism, with the understanding that it applies to the other shock absorbing apparatus arranged toward the rear of vehicle 10.

Figure 4:
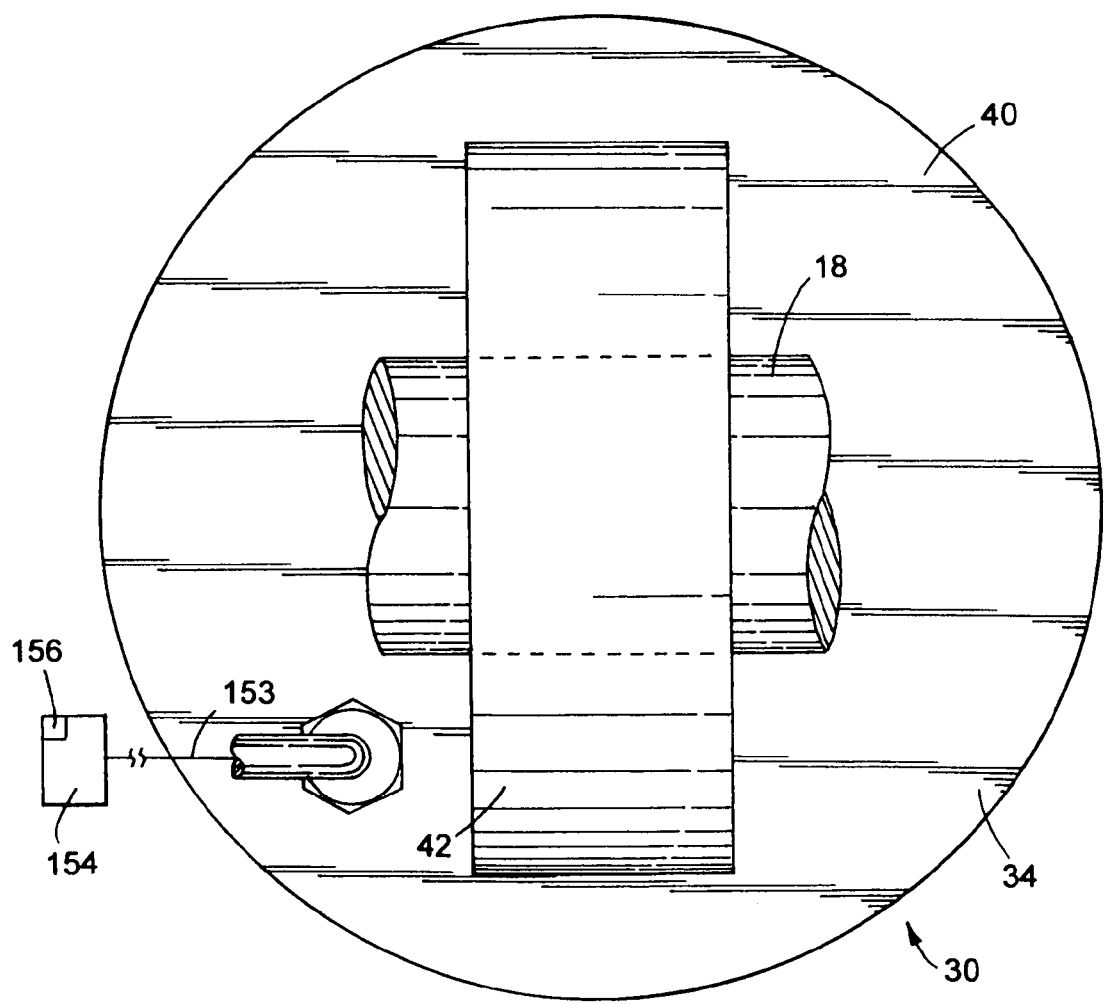
FIG. 4 is an enlarged top plan view of the shock absorbing apparatus illustrated in FIG. 2.
Figure 5:
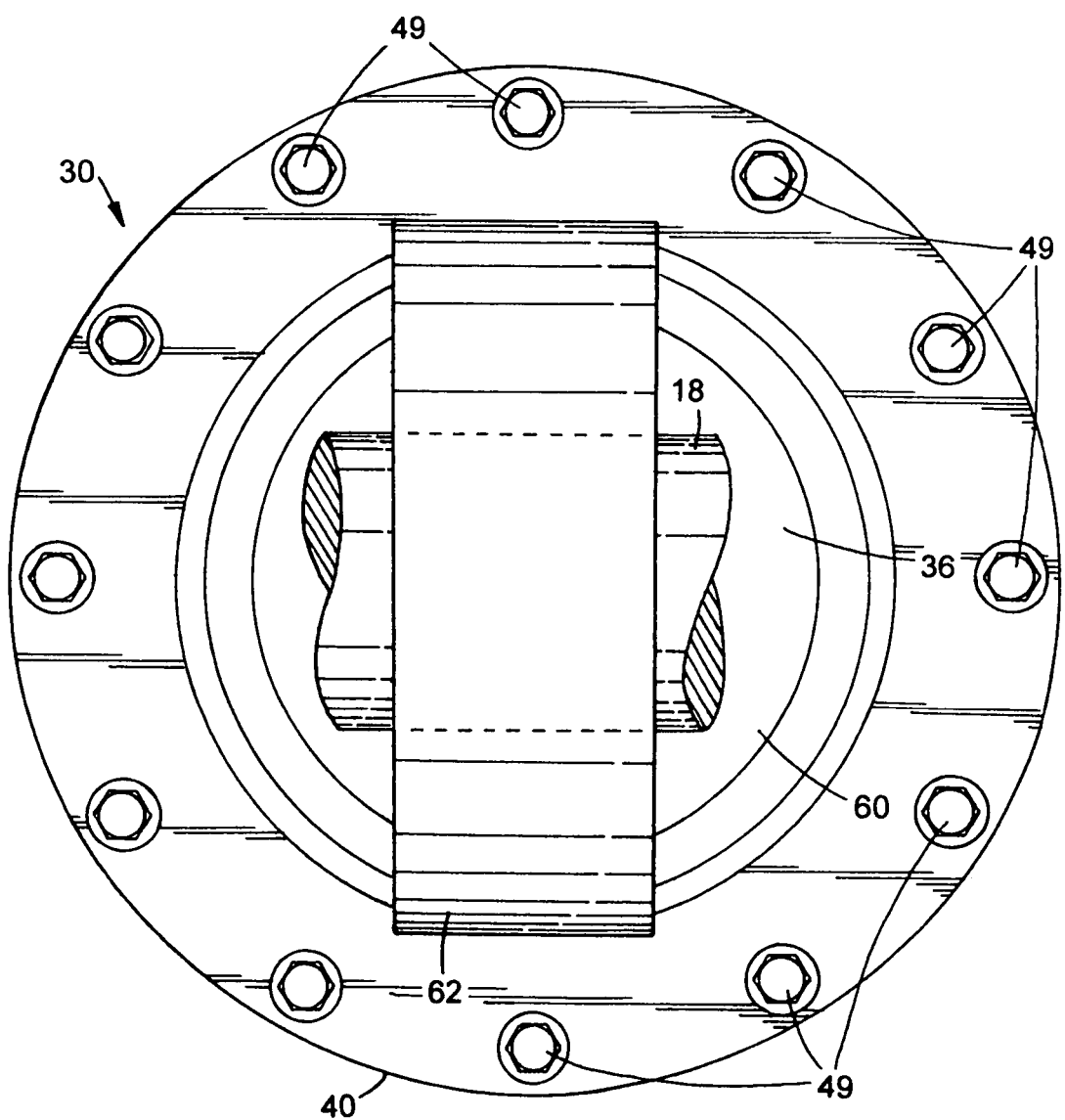
FIG. 5 is an enlarged bottom plan view of the shock absorbing apparatus illustrated in FIG. 2.

Turning to FIGS. 2 and 3, each shock absorbing apparatus 20 includes an axially elongated multipiece housing 30 defining a longitudinal axis 32 extending between first and second ends 34 and 36, respectively. Housing 30 includes a first or outer axially elongated member 40 and a second or inner axially elongated member 60. In a preferred form, each housing member 40, 60 has a generally cylindrical configuration. Lengthwise portions of the housing members 40 and 60 are slidingly arranged, at least partially, in telescopic relation relative to each other. As shown in FIGS. 2, 3 and 4, housing member 40 includes structure 42 for pivotally or articulately securing the first end 34 of shock absorbing apparatus 20 to one group of components on the vehicle 10 (FIG. 1). As shown in FIGS. 2, 3 and 5, housing member 60 preferably includes structure 62 for pivotally or articulately securing the second end 36 of the shock absorbing apparatus 20 to the other group of components on the vehicle 10 (FIG. 1). Structures 42 and 62 can be of any suitable design and construction from that shown without detracting or departing from the spirit and scope of the invention disclosure. Moreover, any suitable connector can be employed, and in the example illustrated, a pin 18 is used to operably interconnect the ends 34 and 36 of the shock absorbing apparatus 20 to the vehicle 10 (FIG. 1).

Figure 6:
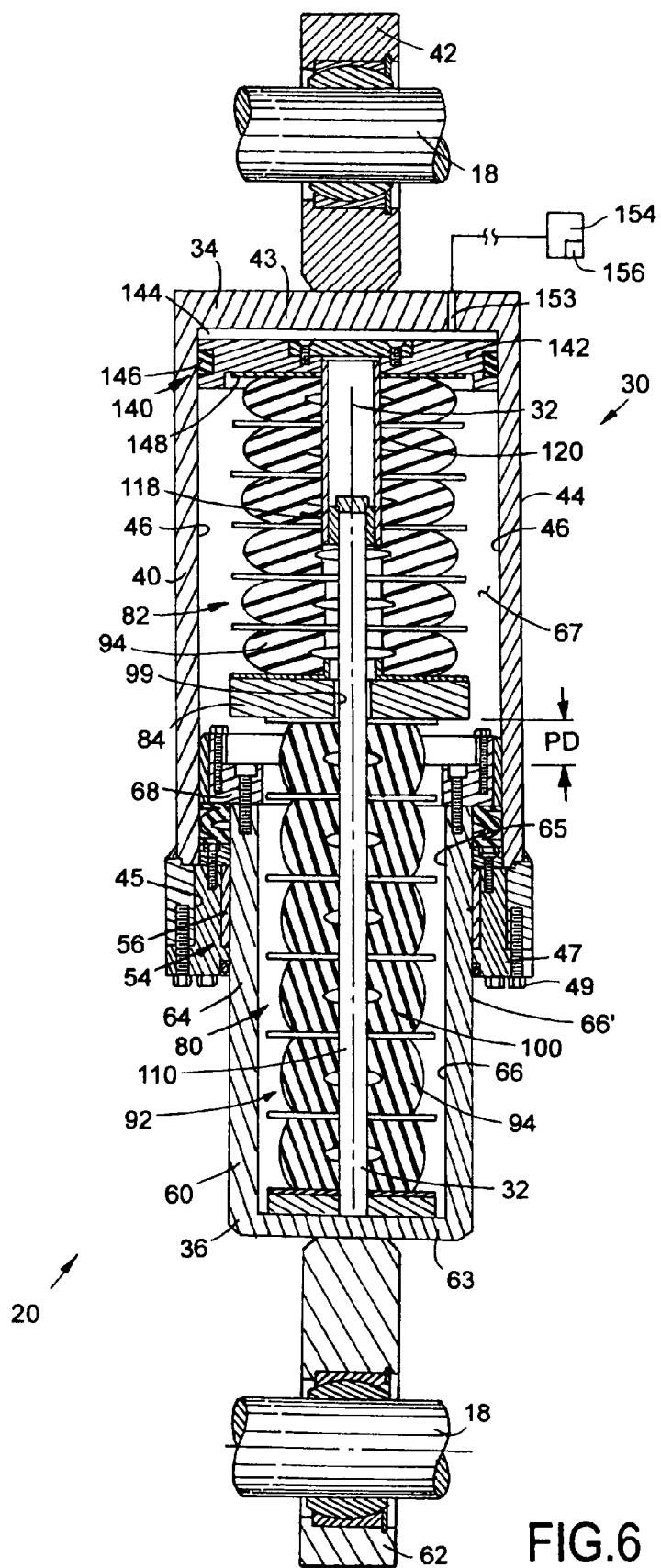
FIG. 6 is a longitudinal sectional view of one form of shock absorbing apparatus embodying principals and teachings of the present invention disclosure.

Turning to FIG. 6, housing member 40 has a closed end 43 and an axially aligned open end 45 with a generally cylindrical body portion 44 extending therebetween. The closed end 43 and body portion 44 of member 40 combine to define a generally cylindrical blind cavity 46 opening only to the open end 45 of housing member 40 and having an inner periphery 46'. As shown, the structure 42 for facilitating connection of the shock absorbing apparatus 20 to vehicle 10 (FIG. 1) is operably carried toward the closed end 43 of housing member 40.

As further illustrated in FIG. 6, housing member 60 has a closed end 63 and an axially aligned open end 65 with a generally cylindrical body portion 64 extending therebetween and which defines a generally cylindrical blind cavity 66 opening only to the open end 65 of housing member 60. Extending away from the open end 65, housing member 60 preferably has a relatively high surface finish on the exterior surface 66' of member 60. In the preferred form, lengthwise portions of the open ends 45 and 65 of housing members 40 and 60, respectively, are arranged in telescopic sliding relation relative to each other such that the cavities 46 and 66 of the housing members 40 and 60, respectively, combine to define a closed space 67 within housing 30. As shown, the structure 62 for facilitating connection of the shock absorbing apparatus 20 to the vehicle 10 (FIG. 1) is operably carried toward the closed end 63 of housing member 40.

Toward its free open end 45, housing 40 furthermore preferably includes a stop 47 for inhibiting inadvertent axial separation of the housing members 40 and 60 relative to each other during operation of the shock absorbing apparatus 20. In the embodiment shown by way of example in FIG. 7, stop 47 is preferably configured as a ring 48 which extends radially inward toward the outer periphery of housing member 60 and is releasably attached toward the open end 45 of housing member 40 by a series of suitable fasteners 49. Ring 48 defines an annular shoulder 50 which acts as part of a stop for limiting inadvertent axial separating movements of the housing members 40 and 60 relative to each other. Preferably, ring 48 has an inner diameter 51 which is only slightly larger than the outer diameter 66' of the exterior of the open end 65 of housing member 60. Preferably, an elastomeric ring 52 is carried by the ring 48 and acts as a wiper scraper along the exterior 66' of the open end 65 of housing member 60 which is telescopically received within the open end 45 of housing member 40.

Figure 7:
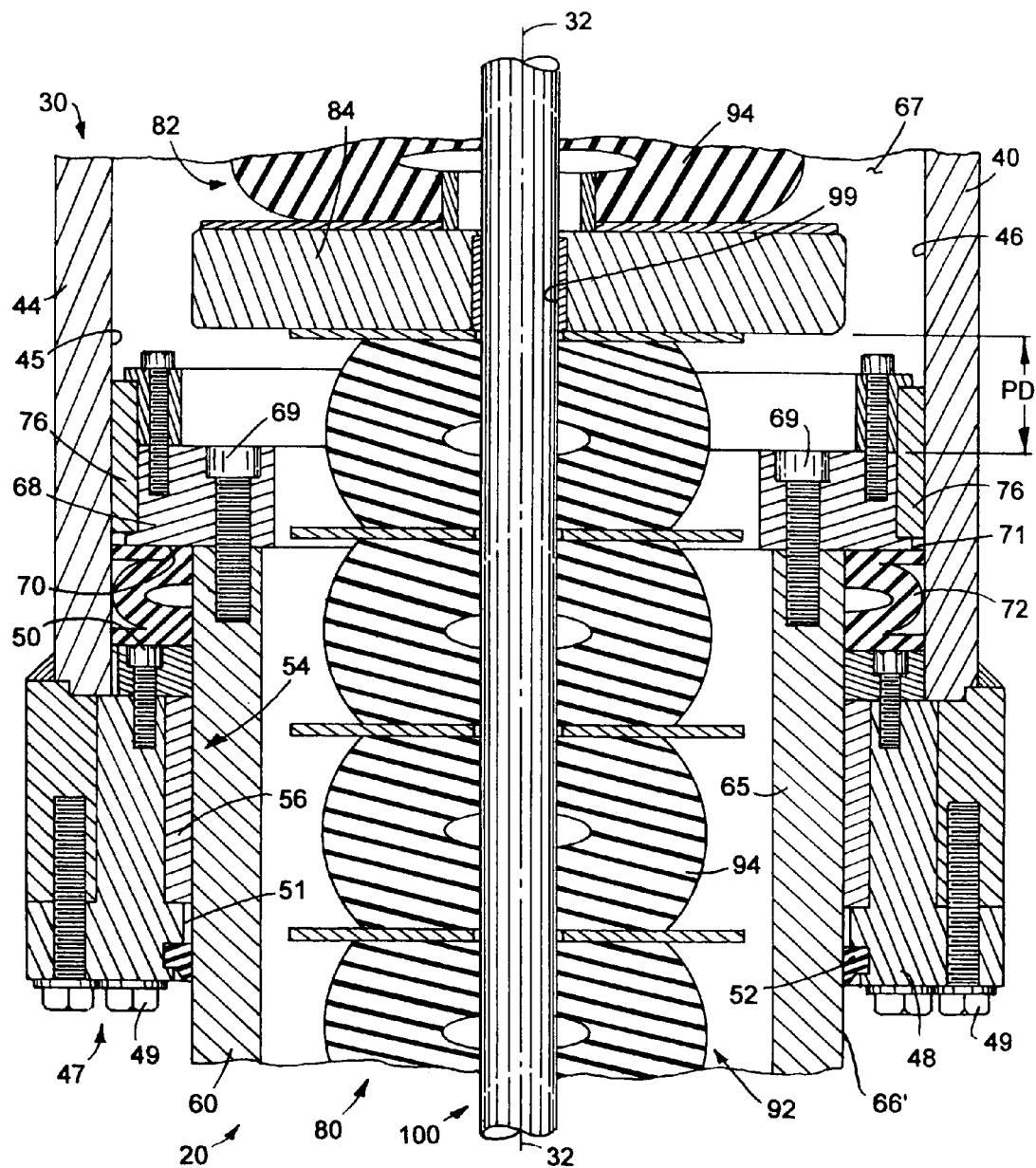
FIG. 7 is an enlarged fragmentary sectional view of a central region of the shock absorbing apparatus illustrated in FIG. 6.

Each shock absorbing apparatus 20 furthermore preferably includes structure 54 for effecting guidance and alignment between those axial lengthwise portions of the housing members 40 and 60 arranged in generally telescopic relation relative to each other. As shown in FIG. 7, one portion of structure 54 includes an annular bushing 56 carried by ring 48 such that bushing 56 slides along that portion of the outer periphery 66' of housing member 60 arranged in telescopic and sliding relation relative to housing member 40.

As shown in FIGS. 6 and 7, an annular follower 68 is provided toward the open end 65 of housing member 60. Suffice it to say, the follower 68 moves with and in response to axial movements of housing member 60. In a preferred embodiment, follower 68 is releasably secured toward the open end 65 of housing 60 with a series of suitable fasteners 69. As shown in FIG. 7, a portion of follower 68 extends radially outward beyond the outer diameter of the open end 65 of housing member 60 and defines an annular shoulder 70 which acts as another part of the stop for limiting axial separating movements of the housing members 40 and 60 relative to each other. In the embodiment shown, follower 68 has an outer diameter 71 which is only slightly less than the inner diameter of the open end 45 of housing member 40. Preferably, an annular elastomeric ring or cushion 72 is arranged between the annular shoulder 50 on ring 48 and the annular shoulder 70 on the follower 68 for dissipating impacts which may occur therebetween.

As further shown in FIG. 7, another portion of structure 54 includes an annular bushing 76 carried by and movable with follower 68. During operation of the shock absorbing apparatus 10, the annular bushing 76 on housing member 40 operably combines with the axially spaced annular bushing 56 on ring 48 to effect guidance and alignment of the housing members 40 and 60 relative to each other and relative to the central axis 32 of housing 30.

Each shock absorbing apparatus 20 furthermore includes a dual rate spring assembly 80 axially disposed within the closed space 67 of the shock absorbing apparatus housing 30. The dual rate spring assembly 80 includes a first axially elongated elastomeric spring assembly 82 arranged in stacked relation and operable in series with a second axially elongated elastomeric spring assembly 92. As such, the spring assembly 80 permits the vehicle suspension system to function in: 1) an empty load condition; or, 2) a loaded condition.

As shown in FIG. 6, the axially elongated elastomeric spring assembly 92 is primarily disposed within housing member 60 for absorbing, dissipating and returning a first predetermined level of energy imparted or applied to the shock absorbing apparatus 20 when the ends 34 and 36 of housing 30 are axially compressed toward each other within a predetermined range of axial movement. After apparatus 20 is assembled and is arranged in operable combination with vehicle 10 (FIG. 1), one end of spring assembly 92 acts against the closed end 63 of housing member 60. A second end of spring assembly 92 acts against a spring seat or transition plate 84 preferably disposed for movements within the closed space 67 of housing 30 between the opposed ends of spring assemblies 82 and 92. More specifically, the spring seat 84 is disposed between the closed end 43 of housing member 40 and the follower 68.

In an unloaded condition, and in the embodiment shown in FIGS. 6 and 7, the design and action of spring assembly 92 positions the spring seat or transition plate 84 in axially spaced relation from the follower 68 carried by, housing member 60. That is, during one phase of operation of apparatus 20, a predetermined axial distance or gap PD separates the follower plate 68, carried by housing member 60, from the spring seat or transition plate 84. This design allows the elastomeric spring assembly 92 of spring assembly 80 to function when the vehicle 10 (FIG. 1) is operated in an empty condition and protects spring assembly 92 against damage when the vehicle is operated in a loaded condition.

The other spring assembly 82 of the dual rate spring assembly 80 is axially disposed within housing member 40 in series with the first spring assembly 92 for absorbing, dissipating and returning a second predetermined level of energy, different from than the first predetermined level of energy, imparted or applied to the shock absorbing apparatus 20 when the ends 34 and 36 of housing 30 are axially compressed toward each other. Notably, spring assembly 82 functions when the first predetermined level of energy imparted to the shock absorbing apparatus 20, is exceeded, i.e. during loaded conditions for the vehicle 10. As shown in FIG. 6, and after apparatus 10 is assembled and in arranged in operable combination with vehicle 10 (FIG. 1), one end of spring assembly 82 acts against the closed end 43 of housing member 40. A second end of spring assembly 82 acts against the spring seat 84.

Figure 8:
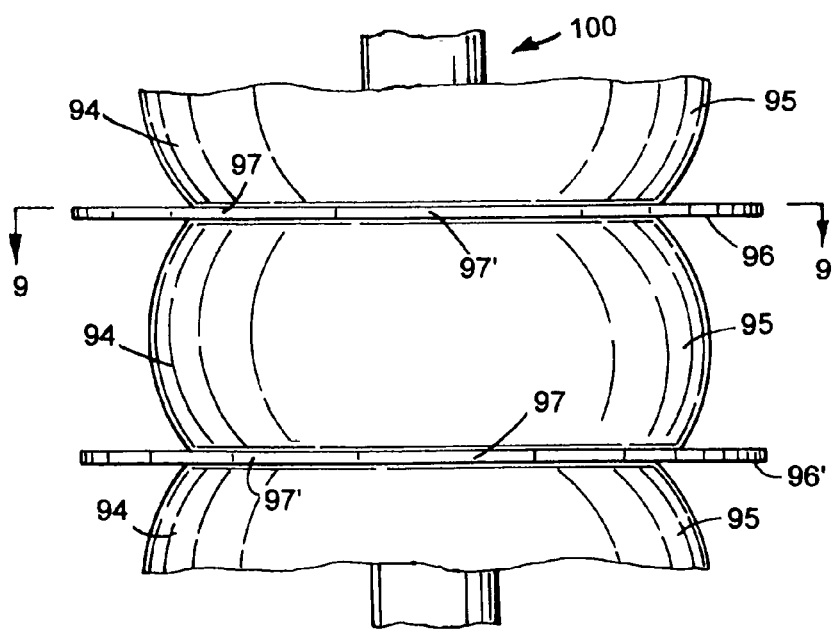
FIG. 8 is a fragmentary illustration of a elastomeric pad stack forming part of the shock absorbing apparatus of the present disclosure.

Each spring assembly 82, 92 has a multi-tiered construction including a series of longitudinally stacked elastomeric spring pads, generally identified by reference numeral 94. As shown in FIG. 8, each spring pad 94 has an elastomeric member 95 sandwiched between two metal plates 96, 96'. Each plate 96, 96' is operably secured to opposed ends or load faces 97, 97' of the elastomeric member 95. Any suitable means may be employed to accomplish the physical juncture between the elastomeric member 95 and each plate 96, 96'. In the form shown, each elastomeric member 95 has a donut-like or torodial configuration whereby minimizing the cross-sectional space of each spring pad. Preferably, the pads 94 are formed using the process and methodology disclosed in U.S. Pat. No. 5,351,844 to R. A. Carlstedt; the applicable portions of which are incorporated herein by reference. Suffice it to say, the elastomeric member 95 is preferably formed from a copolyester polymer elastomer such as that manufactured and sold by DuPont under the tradename "HYTREL" and the art known equivalents thereto with the resultant spring having a plastic strain to elastic strain ratio greater than 1.5 to 1. In a preferred form, member 95 of each spring pad 94 has a durometer hardness of about 55 on the D Scale.

Although spring assemblies 82 and 92 are generally equally compressible during operation of the shock absorbing apparatus 20, the spring pads 94 comprising spring assembly 92 are designed to function for the loads typically incurred or encountered in an empty condition for vehicle 10 (FIG. 1). That is, the spring pads 94 comprising spring assembly 92 have a lower aspect ratio than the spring pads 94 comprising spring assembly 82. In the embodiment shown in FIG. 6, the spring pads 94 comprising spring assembly 92 have a narrower and axially thicker cross-sectional configuration than do the spring pads 94 comprising spring assembly 82 thus yielding the differences in the aspect ratios of the two spring assemblies. As such, the spring pads 94 comprising spring assembly 92 are designed to function for the loads typically incurred or encountered in an empty condition for vehicle 10 (FIG. 1) while the spring pads 94 comprising spring assembly 82 are designed to function for the loads typically incurred or encountered in a loaded condition for vehicle 10 (FIG. 1).

The shock absorbing apparatus 20 illustrated by way of example in FIG. 6 furthermore preferably includes an axially elongated guide assembly 100. The guide assembly 100 extends substantially a cumulative axial length of and controls compression of the first and second spring assemblies 82 and 92, respectively. That is, guide assembly 100 inhibits "snaking" and other undesirable movements of the first and second spring assemblies 82 and 92, respectively, during compression of the dual rate spring assembly 80. Moreover, and in a preferred form, an operable length of the guide assembly 100 is automatically adjustable to the operative length of the housing 30 during operation of the shock absorbing apparatus 20.

Figure 9:
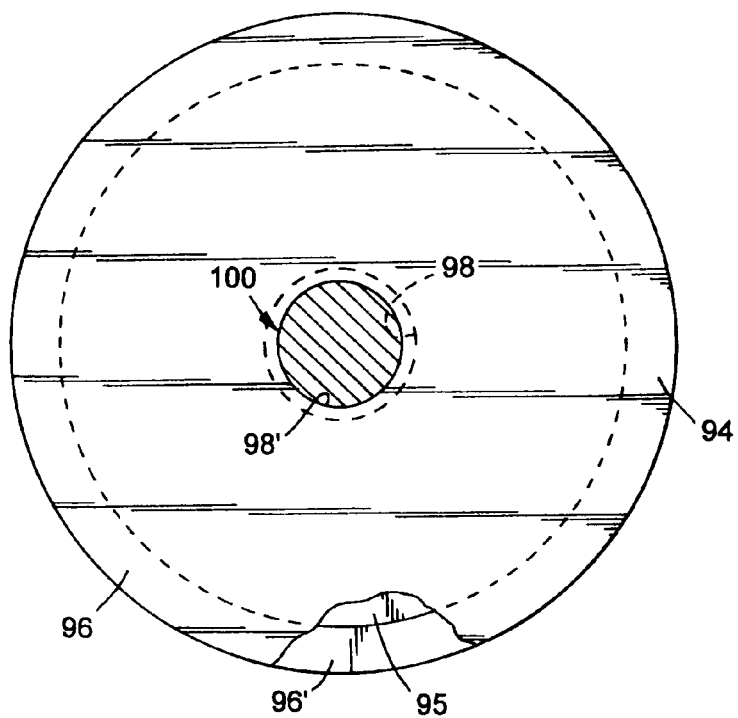
FIG. 9 is a sectional view taken along line 9-9 of FIG. 8.

Guide assembly 100 axially extends generally centrally through the spring assemblies 82 and 92 and through the spring seat or transition plate 84. In this regard, and as shown in FIG. 9, the elastomeric member 95 of each spring pad 94 comprising spring assemblies 82 and 92 (FIG. 6) has a generally centrally disposed bore or opening 98 through which a lengthwise portion of the guide assembly 100 axially passes. The bore or opening 98 in the elastomeric member 95 of each spring pad 94 is sized relative to the outer diameter of that portion of the guide assembly 100 passing therethrough so as to accommodate the flow of elastomeric material subjected to compression whereby eliminating having the elastomeric member 95 "snagging" or otherwise adversely engaging with the outer diameter of guide assembly 100. Moreover, and as shown in FIG. 9, the plates 96, 96' of each spring pad 94 comprising the spring assemblies 82 and 92, define a generally centralized opening 98' for allowing the guide assembly 100 unrestricted endwise passage therethrough. Additionally, and as shown in FIGS. 6 and 7, the spring seat or transition plate 84 also defines a generally centralized opening 99 for allowing the guide assembly 100 unrestricted endwise passage therethrough.

In the embodiment illustrated in FIG. 6, guide assembly 100 includes two axially elongated guides 110 and 120 arranged, at least partially, in telescoping relation relative to each other and which are generally coaxially aligned with the axis 32 of housing 30. In the illustrated embodiment, guide 110 extends from the closed end 63 of housing member 60 through the spring seat or transition plate 84 and toward the closed end 43 of housing member 40.

Figure 10:
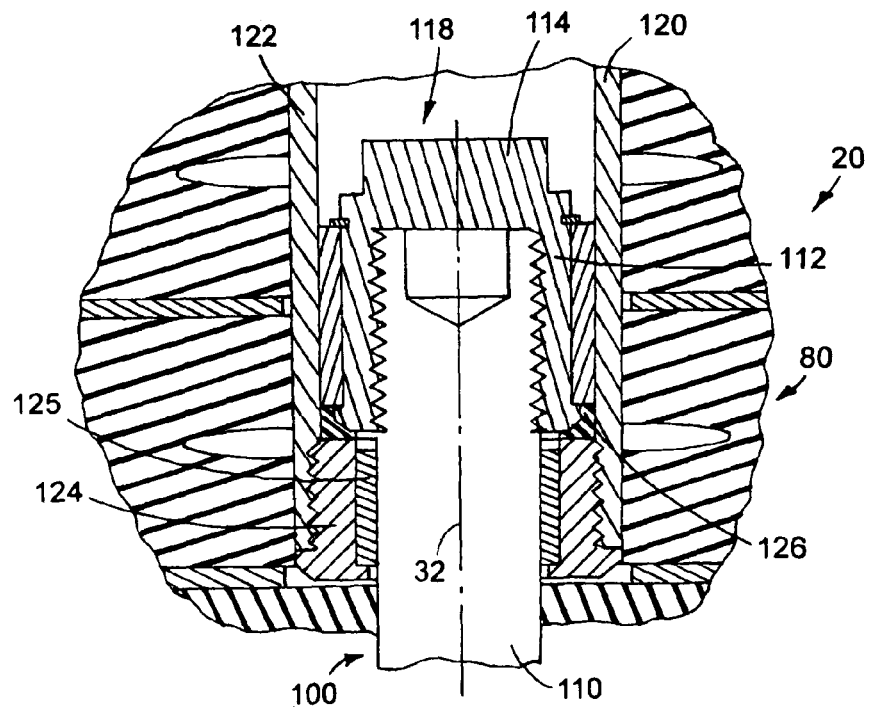
FIG. 10 is an enlarged fragmentary sectional view of an area of one form of shock absorbing apparatus embodying principals and teachings of the present invention disclosure.

As shown in FIG. 6, guide 120 of assembly 100 extends longitudinally away from the closed end 43 of housing member 40 and toward the closed end 63 of housing member 60 for an axial distance shorter than the extended axial distance of guide 110. As shown in FIG. 10, lengthwise portions of the guides 110 and 120 are arranged in telescoping relation relative to each other. In the form shown by way of example in FIG. 10, at least the end 122 of guide 120 has an elongated and generally cylindrical tubular configuration defining an inside diameter which compliments a predetermined outer diameter of a cap 114, arranged toward a distal end of guide 110, such that a sliding fit is established between the ends 112 and 122 of guides 110 and 120, respectively. By this design, guides 110 and 120 of assembly 100 maintain the elastomeric spring pads 94 of the spring assemblies 82 and 92 in aligned relation relative to each other and relative to axis 32 while allowing for axial compression of the operative length of guide assembly 100 during operation of the shock absorbing apparatus 20. It should be appreciated, however, the design and construction of guide assembly 100 can readily be inverted from that shown without detracting or departing from the spirit and scope of this invention disclosure.

In the embodiment illustrated by way of example in FIG. 10, a mechanism 118 allows spring assembly 80 to be designed with opposed ends being interconnected and permits a preload condition to be imparted to spring assembly 80.

In one form, mechanism 118 includes threadably securing the cap 114 to the end 112 of guide 110 such that rotation of the cap 114, as with a suitable tool (not shown), relative to guide 110 results in lengthwise adjustment of the cap 114 relative to the guide 110. Moreover, mechanism 118 preferably includes an adjustment member 124 arranged in threaded engagement with the end 122 of guide 120. Member 124 preferably includes a bushing 125. Member 124 and bushing 125 journal and permits a lengthwise portion of guide 110 to pass therethrough. When mechanism 118 is assembled, inner ends of cap 114 and member 124 are arranged in linearly adjacent relation relative to each other. Preferably, a resilient washer or member 126 separates adjacent ends of the cap 114 and member 124. Moreover, and when mechanism 118 is assembled, opposed ends of spring assembly 80 are joined and the ability to lengthwise adjust cap 114 relative to guide 110 and member 124 relative to member 120 permits a preload force to be imparted, if desired, to the spring assembly 80.

Preferably, the shock absorbing apparatus 20 of this invention disclosure furthermore allows the payloads carried by vehicle 10 (FIG. 1) to be monitored whereby reducing overloading of the vehicle while monitoring vehicle activities such as rough roads, and etc. Toward these ends, the shock absorbing apparatus 20 furthermore preferably includes an apparatus 140 (FIG. 6) for monitoring compressive loads applied to the shock absorbing apparatus 20 during operation of the heavy off-road vehicle 10 (FIG. 1).

In the embodiment illustrated in FIG. 6, monitoring apparatus 140 includes a piston head 142 arranged for sliding movements proximate to the closed end 43 of housing member 40. Notably, a relatively small volume pressure chamber 144 is defined between piston head 142 and the closed end 43 of housing member 40.

After the shock absorbing apparatus 20 is arranged in operable combination with vehicle 10 (FIG. 1), a suitable fluid, such as oil or the like, fills the chamber 144. In the embodiment illustrated in FIG. 6, the monitoring apparatus 140 is designed as a closed system and includes a suitable annular seal 146 carried by the piston head 142 to prevent fluid from chamber 144 leaking past the piston head 142 toward the spring assemblies 82 and 92 when a compressive load is applied to the shock absorbing apparatus 20. Because chamber 144 has a relatively small volume for effecting the desired ends, seal 146 will experience only a limited amount of travel thereby prolonging the useful life of the seal 146 while concurrently reducing maintenance.

In a preferred form, piston head 142 defines a recess or seat 148 concentrically arranged relative to the central axis 32 of housing 30. Such recess or seat 148 is configured to accommodate and locate the plate 96' of the adjacent spring pad 94 whereby further promoting stability to the spring assembly 82 during operation of the shock absorbing apparatus 20.

In the embodiment shown in FIG. 6, guide 120 of assembly 100 is secured to, projects from, and moves with the piston head 142 of apparatus 140. Notably, the end of guide 120 carried by piston head 142 is closed by the piston head 142 whereby inhibiting passage of fluid from chamber 144 into guide 120.

Preferably, and as shown in FIGS. 4 and 6, housing 30 defines a passage 153 for directing pressurized fluid between chamber 144 and an apparatus 154 during operation of the shock absorbing apparatus 20. Apparatus 154 includes a conventional device 156 capable of developing and delivering an electric signal indicative of the payload applied to the shock absorbing apparatus 20 as a result of the pressure measured by apparatus 154. In a preferred form, device 156 is in the form of a pressure transducer.

Figure 11:
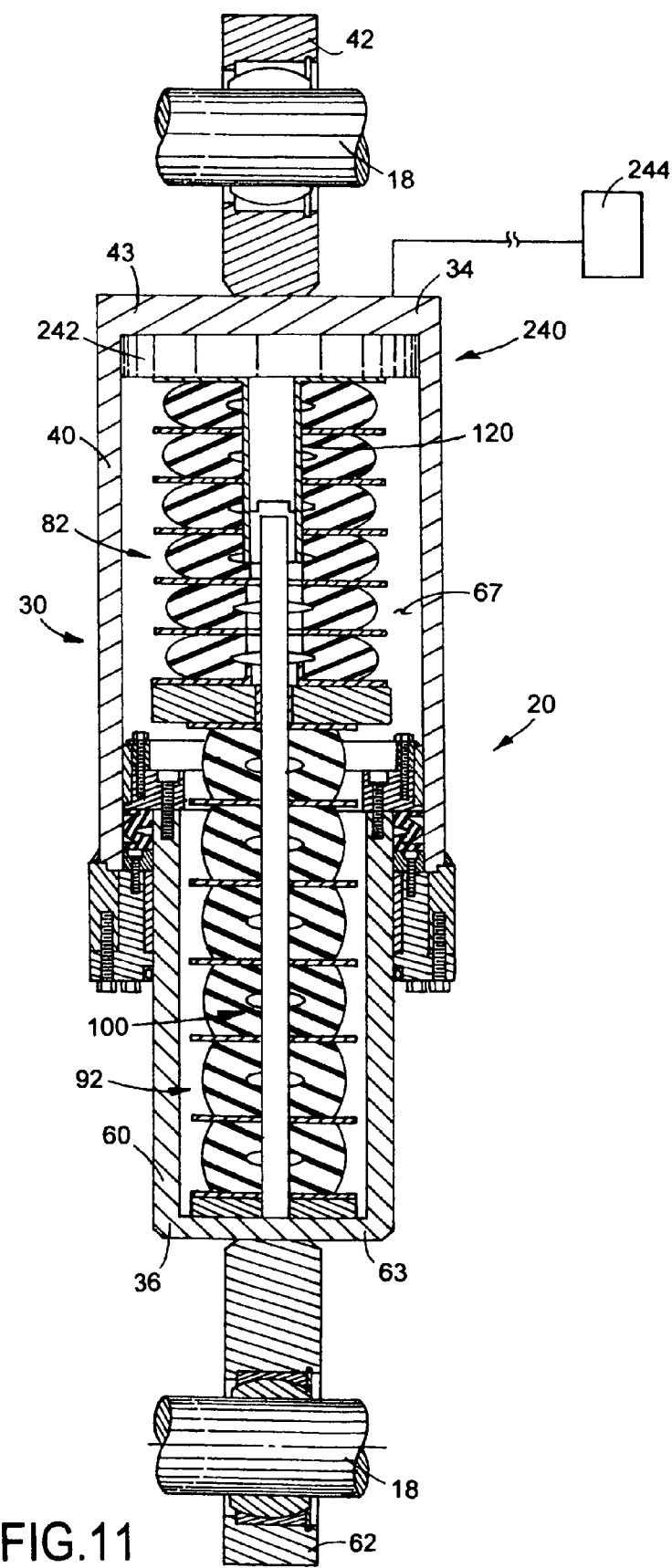
FIG. 11 is a longitudinal sectional view similar to FIG. 6 showing another form of shock absorbing apparatus embodying principals and teachings of the present invention disclosure.

An alternative form of apparatus for monitoring compressive loads applied to the shock absorbing apparatus 20 during operation of the heavy off-road vehicle 10 (FIG. 1) is illustrated in FIG. 11. This alternative form of apparatus for monitoring compressive loads applied to the shock absorbing apparatus 20 during operation of the heavy off-road vehicle 10 (FIG. 1) is designated generally by reference numeral 240.

With the monitoring apparatus 240 shown in FIG. 11, the piston head 142 of monitoring apparatus 140 is removed from housing 30 and replaced with a "pancake" load cell 242 operably coupled to a signal conditioning module 244 of the type manufactured and sold by Stress-Tek, Inc. of Kent, Wash. Of course, other types of load cells and signal conditioning modules could likewise be used without detracting or departing from the true spirit and scope of this invention disclosure. In the embodiment shown by way of example in FIG. 11, the "pancake" load cell 242 is arranged within the closed space 67 of housing 30 preferably toward the closed end 43 of housing member 40. Like piston 42 of monitoring apparatus 140 (FIG. 6), the load cell 242 is operably coupled to the end of guide 120 of assembly 100. During operation of monitoring apparatus 240, loads applied to cell 242 are measured by and converted into an electric signal by module 244 such that the payload applied to the shock absorbing apparatus 20 can be monitored during operation of vehicle 10 (FIG. 1).

Figure 12:
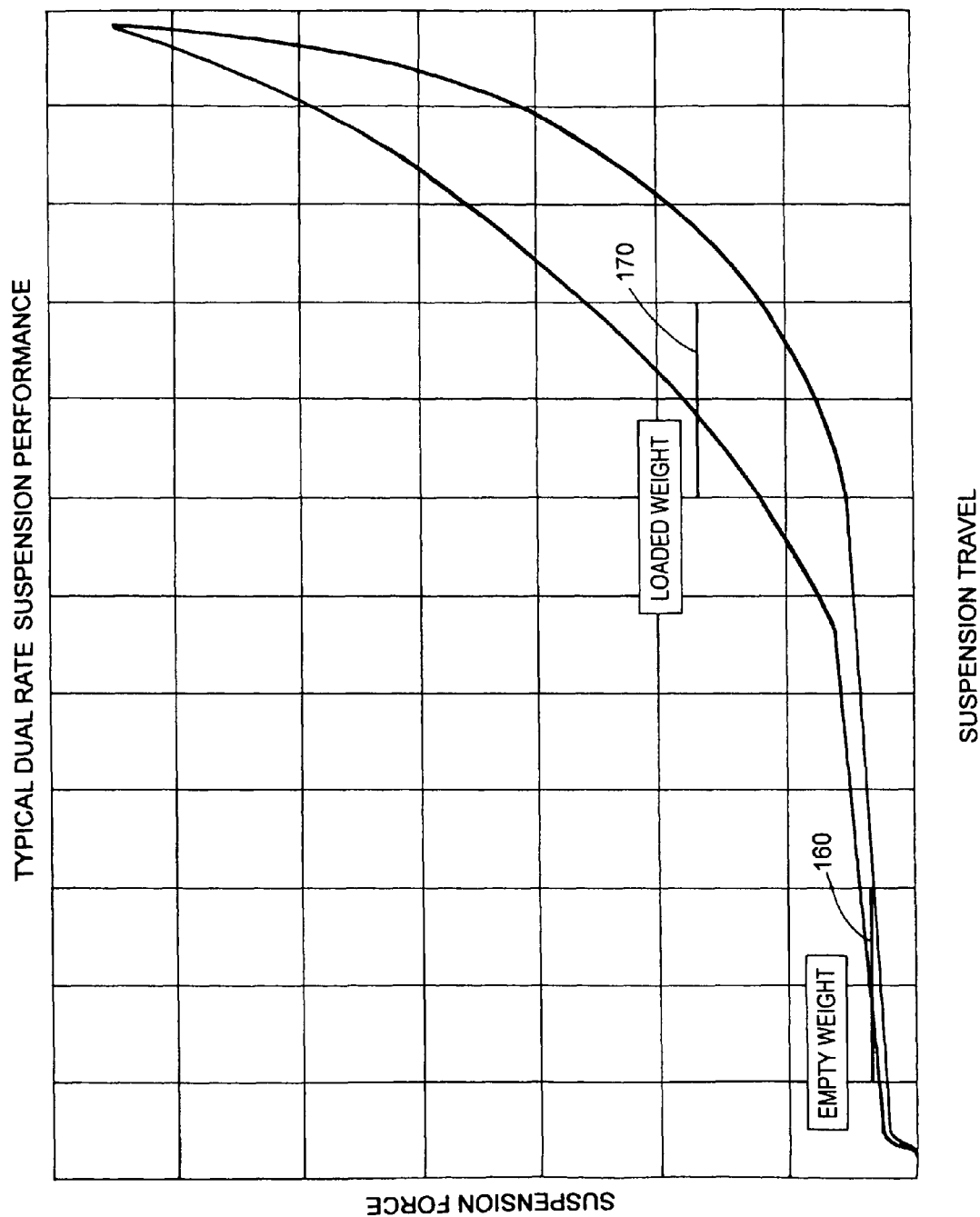
FIG. 12 is a graph schematically illustrating performance characteristics of a dual rate shock absorbing apparatus embodying principals and teachings of the present invention disclosure.

FIG. 12 schematically illustrates the dual rate performance of the shock absorbing apparatus 20 when mounted to a vehicle 10 (FIG. 1). The horizontal line 160 in the graph shown in FIG. 12 illustrates a load applied to the shock absorbing apparatus 20 when the vehicle 10 is empty. The horizontal line 170 in the graph shown in FIG. 12 illustrates a load applied to the shock aborbing apparatus 20 when the vehicle 10 is loaded. Until the vehicle 10 (FIG. 1) is loaded, spring assembly 92 acts to absorb, dissipate and return energy imparted to shock absorbing apparatus 20. After the vehicle 10 is loaded, spring assembly 82 acts to absorb, dissipate and return energy during operation of the shock absorbing apparatus 20. Notably, and as compared to the portion of the graph illustrating performance of spring assembly 82, the "softer" spring assembly 92 has a significantly greater suspension travel during the period between when the vehicle 10 is empty and when the vehicle 10 is loaded. As such, and with a dual rate suspension system of the type described above, suspension performance of the shock absorbing apparatus 20 can be optimized for the particular application by altering the ratio of empty to loaded spring assembly performance.

Apparatus 20 is shown in FIG. 6 in its extended or unloaded state. When a force is applied to the absorbing apparatus 20 and ends 34, 36 of housing 30 are axially compressed toward each other, spring assembly 92 acts to absorb, dissipate and return energy imparted to the shock absorbing apparatus 20. As the ends 34 and 36 of the housing 30 compress and expand during operation of apparatus 20, spring assembly 92 serves to absorb, dissipate and return a first level of energy acting on the shock absorbing apparatus 20. Moreover, and as ends of the shock absorbing apparatus 20 are compressed toward each other during operation, spring assembly 92 presses against transition plate 84 whereby transferring energy to spring assembly 82 and, ultimately, to the apparatus, in whatever form, for monitoring the compressive loads applied to the shock absorbing apparatus 20 during operation of the vehicle 10 (FIG. 1). The monitoring apparatus, in whatever form, preferably delivers electric signals indicative of the loads being applied to the shock absorbing apparatus 20 during operation of the vehicle 10 (FIG. 1).

As the opposed ends 34, 36 of housing 30 are compressed and expanded relative to each other, the follower 68 carried by housing member 60 axially slides and moves within the open end 45 of outer housing member 40 toward and away from the transition plate or spring seat 84. As mentioned above, and as shown in FIG. 6, in an empty condition for vehicle 10, the follower 68 carried by housing member 60 is axially spaced a predetermined distance PD from the transition plate 84 by the resiliency of spring assembly 92.

When the loads acting on the shock absorbing apparatus 20 exceed a first predetermined level, i.e., the vehicle 10 (FIG. 1) is loaded with a payload, the ends 34 and 36 of housing 30 are compressed toward each other an extent exceeding the handling or resilient capabilities of spring assembly 92. As such, the follower 68 on housing member 60 slides within the open end 45 of housing member 40 and into contact with the transition plate or spring seat 84. Thereafter, the resiliency of spring assembly 82 acts to resist compression of the ends 34 and 36 of housing 30 toward each other with a second predetermined level of energy which is different from and preferably significantly greater than the first level of energy of spring assembly 92.

Preferably, during operation of the shock absorbing apparatus 20, the apparatus for monitoring and delivering electric signals indicative of the loads acting on the shock absorbing apparatus, in whatever form, continues to operate. Moreover, and during operation of the shock absorbing apparatus 20, the guide assembly 100 operates to maintain the elastomeric pads comprising the spring assemblies 82 and 92, respectively, properly orientated relative to the longitudinal axis 32 so as to optimize performance of the dual rate spring assembly 80. The ability of the guide assembly 100 to automatically adjust to the operable length of the shock absorbing housing 30 during operation of apparatus 20 furthermore facilitates operation of the dual rate spring assembly 80.

From the foregoing, it will be observed that numerous modifications and variations can be made and effected without departing or detracting from the true spirit and novel concept of this invention disclosure. Moreover, it will be appreciated, the present disclosure is intended to set forth exemplifications which are not intended to limit the disclosure to the specific embodiments illustrated. Rather, this disclosure is intended to cover by the appended claims all such modifications and variations as fall within the spirit and scope of the claims.

What is claimed is:

1. A dual rate shock absorbing apparatus for a suspension system of a heavy off-road vehicle, comprising:
a housing including an axially elongated outer housing member having a closed end and an open end, with the closed end of said outer housing member having structure for facilitating connection of said housing to a first part on said vehicle, and with said housing further including an axially elongated inner housing member having a closed end and an open end, with lengthwise portions of the open ends of said inner and outer housing members being arranged in sliding relation relative to each other in response to loads being exerted on said absorbing apparatus, and with the closed end of said inner housing member having structure for facilitating connection of said inner housing member to a second part on said vehicle;
a spring seat arranged in an interior chamber defined by said inner and outer housing members;

a first elastomeric spring assembly arranged axially within the outer housing member for absorbing, dissipating and returning a first predetermined level of energy imparted to said shock absorbing apparatus when the closed ends of said housing members are axially compressed toward each other within a predetermined range of axial movement, with one end of said first spring assembly acting against a closed end of said outer housing member and an axially aligned second end acting against said spring seat; and a second elastomeric spring assembly arranged axially within the inner housing member for absorbing, dissipating and returning a second predetermined level of energy different from said first predetermined level of energy imparted to said shock absorbing apparatus when the closed ends of said housing members are axially compressed toward each other;

an axially elongated guide assembly substantially extending a cumulative length of said first and second spring assemblies for controlling axial compression of said first and second spring assemblies, and with an operable length of said guide assembly being automatically adjustable to the length of said housing during operation of said shock absorbing apparatus; and a follower carried by and toward the open end of said inner housing member such that said follower moves with said inner housing member and is operably arranged for engagement with said spring seat during operation of said shock absorbing apparatus, with said follower facilitating guidance of said inner and outer housing members relative to each other in response to axial loads being exerted upon said shock absorbing apparatus.

2. The shock absorbing apparatus according to claim 1 wherein said elongated guide assembly axially extends generally centrally through the first and second spring assemblies and said spring seat.

3. The shock absorbing apparatus according to claim 1 wherein said elongated guide assembly axially includes two axially elongated guides arranged in at least partially telescoping relation relative to each other.

4. The shock absorbing apparatus according to claim 1 further including a stop for inhibiting inadvertent axial separation of the housing members relative to each other.

5. The shock absorbing apparatus according to claim 1 further including structure arranged in axially spaced relation from said follower for axially guiding and aligning said outer housing member and said inner housing member for axial sliding movements relative to each other.

6. A dual rate shock absorbing apparatus for a suspension system of a heavy off-road vehicle, comprising:

a housing including an axially elongated outer housing member having a closed end and an open end, with the closed end of said outer housing member having structure for facilitating connection of said housing to a first part on said vehicle, and with said housing further including an axially elongated inner housing member having a closed end and an open end, with lengthwise portions of the open ends of said inner and outer housing members being arranged in sliding relation relative to each other in response to loads being exerted on said absorbing apparatus, and with the closed end of said inner housing member having structure for facilitating connection of said inner housing member to a second part on said vehicle;

a spring seat arranged in an interior chamber defined by said inner and outer housing members;

a first elastomeric spring assembly arranged axially within the outer housing member for absorbing, dissipating and returning a first predetermined level of energy imparted to said shock absorbing apparatus when the closed ends of said housing members are axially compressed toward each other within a predetermined range of axial movement, with one end of said first spring assembly acting against a closed end of said outer housing member and an axially aligned second end acting against said spring seat;

a second elastomeric spring assembly arranged axially within the inner housing member for absorbing, dissipating and returning a second predetermined level of energy different from said first predetermined level of energy imparted to said shock absorbing apparatus when the closed ends of said housing members are axially compressed toward each other;

an axially elongated guide assembly substantially extending a cumulative length of said first and second spring assemblies for controlling axial compression of said first and second spring assemblies, and with an operable length of said guide assembly being automatically adjustable to the length of said housing during operation of said shock absorbing apparatus; and an apparatus for monitoring compressive loads applied to the shock absorbing apparatus during operation of said heavy off-road vehicle, wherein said apparatus for monitoring compressive loads includes a load cell arranged toward the closed end of at least one of the inner and outer housing members for monitoring and providing a signal indicative of the load applied to said shock absorbing apparatus, and wherein said apparatus for monitoring compressive loads includes a piston head slidably sealed to an inner periphery of at least one of the inner and outer housing members such that a pressurized fluid chamber is defined between said piston head and the closed end of said at least one of the inner and outer housing members, with said piston head being operably coupled to and movable with one of said spring assemblies, and a device for monitoring the level of pressure in said chamber and for generating a signal indicative of the level of pressure in said chamber.

7. The shock absorbing apparatus according to claim 6 wherein the device for monitoring the level of pressure in said chamber includes a pressure transducer.

8. A dual rate shock absorbing apparatus for a suspension system of a heavy off-road vehicle, comprising:

an axially elongated housing having first and second axially spaced ends, with each end of said housing having structure for facilitating connection of said shock absorbing apparatus operably between first and second parts on said vehicle, and wherein said housing includes an axially elongated inner member having a closed end and an open end and an axially elongated outer member having a closed end and an open end, with lengthwise portions of the open ends of said inner and outer members being arranged in sliding relation relative to each other;

an axially elongated elastomeric spring assembly arranged within an interior chamber defined by said housing between the closed ends of said inner and outer members, said spring assembly including a first elastomeric spring assembly for absorbing, dissipating and returning a first predetermined level of energy imparted to said shock absorbing apparatus when the closed ends of said members are axially compressed toward each other within a predetermined range of axial movement, a second elastomeric spring assembly for absorbing, dissipating and returning a second predetermined level of energy after the first predetermined level of energy imparted to said shock absorbing apparatus is exceeded, and a spring seat disposed between opposed ends of said first and second elastomeric spring assemblies;

an axially elongated guide assembly substantially extending a cumulative length of and generally centrally through said first and second spring assemblies for controlling axial compression of said first and second spring assemblies, and with an operable length of said guide assembly being automatically adjustable to the length of said housing during operation of said shock absorbing apparatus; and a follower carried by and toward the open end of said inner member such that said follower moves with said inner member and is operably arranged for engagement with said spring seat during operation of said shock absorbing apparatus, with said follower facilitating concentric guidance of said inner and outer members relative to each other in response to axial loads being exerted upon said shock absorbing apparatus.

9. The shock absorbing apparatus according to claim 8 wherein said elongated guide assembly axially includes two axially elongated guides arranged in at least partially telescoping relation relative to each other.

10. The shock absorbing apparatus according to claim 8 further including a stop for inhibiting inadvertent axial separation of the members of said housing relative to each other.

11. The shock absorbing apparatus according to claim 8 further including structure arranged in axially spaced relation from said follower for guiding and aligning an interior periphery of said outer member and an outer periphery of said inner member for axial sliding movements relative to each other.

12. The shock absorbing apparatus according to claim 11 wherein the structure for aligning and guiding the inner and outer members relative to each other includes an annular bushing.

13. A dual rate shock absorbing apparatus for a suspension system of a heavy off-road vehicle, comprising:

an axially elongated housing having first and second axially spaced ends, with each end of said housing having structure for facilitating connection of said shock absorbing apparatus operably between first and second parts on said vehicle, and wherein said housing includes an axially elongated inner member having a closed end and an open end and an axially elongated outer member having a closed end and an open end, with lengthwise portions of the open ends of said inner and outer members being arranged in sliding relation relative to each other;

an axially elongated elastomeric spring assembly arranged within an interior chamber defined by said housing between the closed ends of said inner and outer members, said spring assembly including a first elastomeric spring assembly for absorbing, dissipating and returning a first predetermined level of energy imparted to said shock absorbing apparatus when the closed ends of said members are axially compressed toward each other within a predetermined range of axial movement, a second elastomeric spring assembly for absorbing, dissipating and returning a second predetermined level of energy after the first predetermined level of energy imparted to said shock absorbing apparatus is exceeded, and a spring seat disposed between opposed ends of said first and second elastomeric spring assemblies;

an axially elongated guide assembly substantially extending a cumulative length of and generally centrally through said first and second spring assemblies for controlling axial compression of said first and second spring assemblies, and with an operable length of said guide assembly being automatically adjustable to the length of said housing during operation of said shock absorbing apparatus; and an apparatus for monitoring compressive loads applied to the shock absorbing apparatus during operation of said heavy off-road vehicle, wherein said apparatus for monitoring compressive loads includes a load cell arranged toward the closed end of said outer housing member for monitoring and providing a signal indicative of the load applied to said shock absorbing apparatus, and wherein said apparatus for monitoring compressive loads includes a piston head slidably sealed to an inner periphery of one of said members such that a pressurized fluid chamber is defined between said piston head and the closed end of said one of said members, with said piston head being operably coupled to and movable with one of said spring assemblies, and a device for monitoring the level of pressure in said chamber and for generating a signal indicative of the level of pressure in said chamber.

14. The shock absorbing apparatus according to claim 13 wherein the device for monitoring the level of pressure in said chamber includes a pressure transducer.

15. A dual rate shock absorbing apparatus for a suspension system of a heavy off-road vehicle, comprising:

a housing including an axially elongated outer generally cylindrical member having a closed end and an open end arranged in axially spaced relation relative to each other, and with the closed end of said outer member having structure for facilitating connection of said housing to a first part on said vehicle, and with said housing further including an axially elongated generally cylindrical inner member having a closed end and an open end arranged in axially spaced relation relative to each other, and with lengthwise portions of the open ends of said inner and outer generally cylindrical members being arranged in telescopic relation relative to each other, and with the closed end of said inner member having structure for facilitating connection of said housing to a second part on said vehicle;

structure disposed between said lengthwise portions of said inner and outer members for effecting guidance and alignment of said inner and outer members relative to each other;

a spring seat arranged in an interior chamber defined by said inner and outer members of said housing;

a first spring assembly arranged axially within the outer member for allowing said shock absorbing apparatus to yield a first spring rate when the closed ends of said members are axially compressed toward each other within a predetermined range of axial movement, with one end of said first spring assembly acting against the closed end of said outer member and an axially aligned second end acting against said spring seat, with said first spring assembly including a series of stacked individual spring pads, with each pad having an elastomeric member with a torodial configuration sandwiched between two plates, and wherein the series of axially stacked individual spring pads included in said first spring assembly are axially guided by an elongated guide axially extending from the closed end of said outer member;

a second spring assembly arranged axially within the inner member for allowing said shock absorbing apparatus to yield a second spring rate when the first spring rate of said first spring assembly is exceeded, with one end of said second spring assembly acting against the closed end of said inner member and an axially aligned second end acting against said spring seat, with said second spring assembly including a series of axially stacked individual spring pads, each pad including an elastomeric member having a torodial configuration sandwiched between two plates, and wherein the series of axially stacked individual spring pads included in said second spring assembly are axially guided by an elongated member axially extending substantially the length of said second spring assembly, and with a free end of the guide of said first spring assembly being arranged in telescoping relation with the elongated member of said second spring assembly such that axial alignment is maintained between the spring assemblies during compression of said shock absorbing apparatus; and a follower carried by and toward the open end of inner member such that said follower moves with said inner member and is operably arranged for engagement with said spring seat during operation of said shock absorbing apparatus, with said follower facilitating concentric guidance of said inner and outer members relative to each other in response to axial loads being exerted upon said shock absorbing apparatus.

16. The shock absorbing apparatus according to claim 15 further including a stop for inhibiting inadvertent axial separation of the members of said housing relative to each other.

17. The shock absorbing apparatus according to claim 15 further including structure for guiding and aligning the open end of said inner and outer members relative to each other and relative to a central axis of said housing.

18. A dual rate shock absorbing apparatus for a suspension system of a heavy off-road vehicle, comprising:

a housing including an axially elongated outer generally cylindrical member having a closed end and an open end arranged in axially spaced relation relative to each other, and with the closed end of said outer member having structure for facilitating connection of said housing to a first part on said vehicle, and with said housing further including an axially elongated generally cylindrical inner member having a closed end and an open end arranged in axially spaced relation relative to each other, and with lengthwise portions of the open ends of said inner and outer generally cylindrical members being arranged in telescopic relation relative to each other, and with the closed end of said inner member having structure for facilitating connection of said housing to a second part on said vehicle;

structure disposed between said lengthwise portions of said inner and outer members for effecting guidance and alignment of said inner and outer members relative to each other;

a spring seat arranged in an interior chamber defined by said inner and outer members of said housing;

a first spring assembly arranged axially within the outer member for allowing said shock absorbing apparatus to yield a first spring rate when the closed ends of said members are axially compressed toward each other within a predetermined range of axial movement, with one end of said first spring assembly acting against the closed end of said outer member and an axially aligned second end acting against said spring seat, with said first spring assembly including a series of stacked individual spring pads, with each pad having an elastomeric member with a torodial configuration sandwiched between two plates, and wherein the series of axially stacked individual spring pads included in said first spring assembly are axially guided by an elongated guide axially extending from the closed end of said outer member; and a second spring assembly arranged axially within the inner member for allowing said shock absorbing apparatus to yield a second spring rate when the first spring rate of said first spring assembly is exceeded, with one end of said second spring assembly acting against the closed end of said inner member and an axially aligned second end acting against said spring seat, with said second spring assembly including a series of axially stacked individual spring pads, each pad including an elastomeric member having a torodial configuration sandwiched between two plates, and wherein the series of axially stacked individual spring pads included in said second spring assembly are axially guided by an elongated member axially extending substantially the length of said second spring assembly, and with a free end of the guide of said first spring assembly being arranged in telescoping relation with the elongated member of said second spring assembly such that axial alignment is maintained between the spring assemblies during compression of said shock absorbing apparatus;

an apparatus for monitoring compressive loads applied to the shock absorbing apparatus during operation of said heavy off-road vehicle, with said apparatus for monitoring compressive loads including a load cell arranged toward the closed end of said outer housing member for monitoring and providing a signal indicative of the load applied to said shock absorbing apparatus, and wherein said apparatus for monitoring compressive loads includes a piston head slidably sealed to an inner periphery one of said members such that a pressurized fluid chamber is defined between said piston head and the closed end of said one of said members, with said piston head being operably coupled to and movable with one of said spring, assemblies, and a device for monitoring the level of pressure in said chamber and for generating a signal indicative of the level of pressure in said chamber.

19. The shock absorbing apparatus according to claim 18 wherein the device for monitoring the level of pressure in said chamber includes a pressure transducer.

20. A dual rate shock absorbing apparatus for a suspension system of a heavy off-road vehicle, comprising:

an axially elongated housing having first and second axially spaced ends, with each end of said housing having structure for facilitating connection of said shock absorbing apparatus operably between first and second parts on said vehicle, and wherein said housing includes an axially elongated inner member having a closed end and an open end and an axially elongated outer member having a closed end and an open end, with lengthwise portions of the open ends of said inner and outer members being arranged in sliding relation relative to each other;

an axially elongated elastomeric spring assembly arranged within an interior chamber defined by said housing between the closed ends of said inner and outer members, said spring assembly including a first elastomeric spring assembly for absorbing, dissipating and returning a first predetermined level of energy imparted to said shock absorbing apparatus when the closed ends of said members are axially compressed toward each other within a predetermined range of axial movement, a second elastomeric spring assembly for absorbing, dissipating and returning a second predetermined level of energy after the first predetermined level of energy imparted to said shock absorbing apparatus is exceeded, and a spring seat disposed between opposed ends of said first and second elastomeric spring assemblies;

an axially elongated guide assembly substantially extending a cumulative length of and generally centrally through said first and second spring assemblies for controlling axial compression of said first and second spring assemblies, and with an operable length of said guide assembly being automatically adjustable to the length of said housing during operation of said shock absorbing apparatus; and a follower carried by and toward the open end of said inner member such that said follower moves with said inner member and is operably arranged for engagement with said spring seat during operation of said shock absorbing apparatus, with said follower facilitating concentric guidance of said inner and outer members relative to each other in response to axial loads being exerted upon said shock absorbing apparatus; and an apparatus for monitoring compressive loads applied to the shock absorbing apparatus during operation of said heavy off-road vehicle, wherein said apparatus for monitoring compressive loads includes a flat load cell arranged toward the closed end of at least one of the inner and outer housing members for monitoring and providing a signal indicative of the load applied to said shock absorbing apparatus.

21. The shock absorbing apparatus according to claim 20 wherein said elongated guide assembly axially includes two axially elongated guides arranged in at least partially telescoping relation relative to each other.

22. The shock absorbing apparatus according to claim 20 further including a stop for inhibiting inadvertent axial separation of the members of said housing relative to each other.

23. The shock absorbing apparatus according to claim 20 further including structure arranged in axially spaced relation from said follower for guiding and aligning an interior periphery of said outer member and an outer periphery of said inner member for axial sliding movements relative to each other.

24. The shock absorbing apparatus according to claim 23 wherein the structure for aligning and guiding the inner and outer members relative to each other includes an annular bushing.

* * * * *